United States Patent
Satish

(10) Patent No.: US 9,245,123 B1
(45) Date of Patent: Jan. 26, 2016

(54) SYSTEMS AND METHODS FOR IDENTIFYING MALICIOUS FILES

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/301,985

(22) Filed: Jun. 11, 2014

Related U.S. Application Data

(60) Provisional application No. 61/989,790, filed on May 7, 2014.

(51) Int. Cl.
*G06F 21/56* (2013.01)

(52) U.S. Cl.
CPC ............ *G06F 21/566* (2013.01); *G06F 21/561* (2013.01)

(58) Field of Classification Search
CPC .............................. H04L 63/145; G06F 12/14
See application file for complete search history.

(56) References Cited

U.S. PATENT DOCUMENTS

| | | | |
|---|---|---|---|
| 8,365,283 B1 * | 1/2013 | Satish et al. ................... | 726/23 |
| 8,621,625 B1 * | 12/2013 | Bogorad et al. ................ | 726/23 |
| 8,806,644 B1 | 8/2014 | McCorkendale et al. | |
| 8,956,729 B2 * | 2/2015 | Fujita et al. ................ | 428/425.8 |
| 2007/0079379 A1 * | 4/2007 | Sprosts et al. .................. | 726/24 |
| 2008/0228814 A1 | 9/2008 | Raley et al. | |
| 2009/0044024 A1 | 2/2009 | Oberheide et al. | |
| 2009/0075592 A1 | 3/2009 | Nystrom et al. | |
| 2012/0159260 A1 * | 6/2012 | Fortune et al. ................ | 714/38.1 |
| 2012/0240236 A1 | 9/2012 | Wyatt et al. | |
| 2012/0317609 A1 | 12/2012 | Carrara et al. | |
| 2013/0117848 A1 | 5/2013 | Golshan et al. | |
| 2015/0220734 A1 | 8/2015 | Nalluri et al. | |

OTHER PUBLICATIONS

Dark Reading, "Automated Malware Analysis Under Attack", http://www.darkreading.com/advanced-threats/automated-malware-analysis-under-attack/240145167, as accessed May 14, 2014, (Dec. 20, 2012).
"Gartner Magic Quadrant for Endpoint Protection Platforms", http://www.mcafee.com/us/independent-reports/gartner-mq-endpoint-protection-platforms.aspx, as accessed May 14, 2014, McAfee, Inc., (May 6, 2013).

(Continued)

*Primary Examiner* — Teshome Hailu
*Assistant Examiner* — Thanh Le
(74) *Attorney, Agent, or Firm* — ALG Intellectual Property, LLC

(57) ABSTRACT

The disclosed computer-implemented method for identifying malicious files may include (1) identifying different instances of a file that is subject to a security evaluation, (2) identifying, within a field for each of the different instances, an attribute of the different instance that associates the different instance with a respective application, (3) determining that the respective applications to which the different instances of the file are associated are distinct applications and are known to be safe, (4) adjusting a security policy for the file, by increasing an estimation that the file is malicious, based on the determination that the respective applications are distinct applications and are known to be safe, and (5) classifying, in a software security system, the file as malicious based on the adjusted security policy that increased the estimation that the file is malicious. Various other methods, systems, and computer-readable media are also disclosed.

20 Claims, 7 Drawing Sheets

(56) References Cited

OTHER PUBLICATIONS

"Next Generation Detection—Dynamic Malware Analysis Service", http://www.proofpoint.com/products/targeted-attack-protection/next-generation-detection.php, as accessed May 14, 2014, Proofpoint, Inc., (on or before May 14, 2014).

Sourabh Satish, et al; Systems and Methods for Analyzing Malware Samples and Assigning File Reputations; U.S. Appl. No. 61/989,790, filed May 7, 2014.

Andrew Collingwood Watson, et al; Systems and Methods for Analyzing Suspected Malware; U.S. Appl. No. 14/314,033, filed Jun. 25, 2014.

Sourabh Satish; Systems and Methods for Analyzing Malware Samples; U.S. Appl. No. 14/314,031, filed Jun. 25, 2014.

Sourabh Satish; Systems and Methods for Detecting Misplaced Applications Using Functional Categories; U.S. Appl. No. 14/315,312, filed Jun. 25, 2014.

Sourabh Satish, et al; Systems and Methods for Identifying Variants of Samples Based on Similarity Analysis; U.S. Appl. No. 14/315,321, filed Jun. 25, 2014.

"Application software", http://en.wikipedia.org/wiki/Application_software, as accessed Apr. 24, 2014, Wikipedia, (May 8, 2004).

"Advanced Threat Report 2013", FireEye, Inc., https://www2.fireeye.com/ppc-advanced-threat-report-2013-uk.html, as accessed Apr. 24, 2014, (2013).

"Palo Alto Networks", https://www.paloaltonetworks.com/, as accessed Apr. 24, 2014, (Oct. 18, 2000).

"FireEye, Inc.", http://www.fireeye.com/, as accessed May 6, 2014, (Oct. 12, 1999).

Dark Reading, "Automated Malware Analysis Under Attack", http://www.darkreading.com/vulnerabilities---threats/automated-malware-analysis-under-attack/d/d-id/1138904?, as accessed May 14, 2014, (Dec. 20, 2012).

Zeltser, Lenny "5 Steps to Building a Malware Analysis Toolkit Using Free Tools", http://zeltser.com/malware-analysis-toolkit/, as accessed May 14, 2014, (1995).

Shinotsuka, Hiroshi "Malware Authors Using New Techniques to Evade Automated Threat Analysis Systems", http://www.symantec.com/connect/blogs/malware-authors-using-new-techniques-evade-automated-threat-analysis-systems, as accessed May 14, 2014, Security Response Blog, Symantec, (Oct. 26, 2012).

"Cuckoo Sandbox", http://www.cuckoosandbox.org/, as accessed May 14, 2014, (2010).

L33T, "Setup Automated Malware Analysis—Cuckoo Sandbox on Bt-3", http://www.securitytube.net/video/6653, as accessed May 14, 2014, (Jan. 14, 2013).

"Blue Coat", https://www.bluecoat.com/, as accessed May 14, 2014, (Mar. 24, 2002).

Sourabh Satish; Identifying Misuse of Legitimate Objects; U.S. Appl. No. 13/940,106, filed Jul. 11, 2013.

\* cited by examiner

Database of Applications
128

| Application | Security Score |
|---|---|
| JAVA Application 460 | 55% |
| ADOBE Application 462 | 92% |
| MS WORD Application 464 | 73% |
| INTERNET EXPLORER Application 466 | 88% |
| ADOBE READER Application 468 | 64% |
| TASK MANAGER Application 470 | 70% |

Database of Files
122

| File | Security Score |
|---|---|
| File 520 | 85% |
| File 522 | 35% |
| File 524 | 48% |

*FIG. 5*

SYSTEMS AND METHODS FOR IDENTIFYING MALICIOUS FILES

CROSS REFERENCE TO RELATED APPLICATION

This application claims priority to provisional U.S. Application No. 61/989,790, filed 7 May 2014, the disclosure of which is incorporated, in its entirety, by this reference.

BACKGROUND

According to one traditional technique, security software companies may estimate that files are safe when the files are associated with valid program characteristics. Security vendors may include this technique in protocols or heuristics for detecting malware. Because safe files are frequently associated with valid program characteristics, this approach allows security vendors to efficiently determine that the files are safe. The approach also allows the security vendors to exclude the safe files from investigation beyond a cursory analysis for valid program characteristics.

Unfortunately, programmers with malevolent motives may associate malicious files with valid program characteristics to avoid detection by security vendors. As a result, these malicious files may increasingly evade detection. Accordingly, the instant disclosure identifies a need for improved methods for detecting malicious files that are disguising themselves as safe.

SUMMARY

As will be described in greater detail below, the instant disclosure describes various systems and methods for identifying malicious files by, for example, increasing estimations that files are malicious for files that are associated with distinct applications that are known to be safe. A computer-implemented method for identifying malicious files may include (1) identifying different instances of a file that is subject to a security evaluation, (2) identifying, within a field for each of the different instances, an attribute of the different instance that associates the different instance with a respective application, (3) determining that the respective applications to which the different instances of the file are associated are distinct applications and are known to be safe, (4) adjusting a security policy for the file, by increasing an estimation that the file is malicious, based on the determination that the respective applications are distinct applications and are known to be safe, and (5) classifying, in a software security system, the file as malicious based on the adjusted security policy that increased the estimation that the file is malicious.

In one embodiment, the attribute that associates the different instance with a respective application may include (1) a file name, (2) a file location, (3) a file path, (4) file metadata, and/or (5) version information. In further embodiments, the version information may be located in the header of a portable executable.

In some examples, the determination that the respective applications to which the different instances of the file are associated are distinct applications that are known to be safe may include a determination that at least a threshold number of the respective applications are distinct applications and are known to be safe. In further examples, the attribute of the instance may include the same type of attribute for each identified instance of the file.

In one embodiment, the different instances of the file are identified by (1) executing a fingerprinting algorithm on a portion of each of the different instances of the file to generate a respective fingerprint, and (2) determining that the respective fingerprints are the same. In some examples, a data mining application may perform the method to classify previously unclassified files.

In some embodiments, identifying the attribute of the instance may include (1) deploying an endpoint agent onto a user endpoint, and (2) using the endpoint agent to collect information relating to the attribute of the instance. In these embodiments, the instance of the file may be located on the user endpoint, and the information may identify the respective application to which the attribute is associated.

In further embodiments, identifying the attribute of the instance may include using a gateway security agent to collect information relating to the attribute of the instance. In these embodiments, the information may identify the respective application to which the attribute is associated.

In one embodiment, the computer-implemented method may further include (1) detecting an additional file that shares a common feature with the file, and (2) classifying the additional file as malicious based on detecting that the additional file has the feature in common with the file. In this embodiment, the common feature may include (1) a static feature in common with the file and/or (2) the same functionality as the file.

In one example, a system for implementing the above-described method may include (1) an identification module, stored in memory, that identifies different instances of a file that is subject to a security evaluation and that identifies, within a field for each of the different instances, an attribute of the different instance that associates the different instance with a respective application, (2) a determination module, stored in memory, that determines that the respective applications to which the different instances of the file are associated are distinct applications and are known to be safe, (3) an adjustment module, stored in memory, that adjusts a security policy for the file, by increasing an estimation that the file is malicious, based on the determination that the respective applications are distinct applications and are known to be safe, (4) a classification module, stored in memory, that classifies, in the system, the file as malicious based on the adjusted security policy that increased the estimation that the file is malicious, and (5) at least one physical processor configured to execute the identification module, the determination module, the adjustment module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify different instances of a file that is subject to a security evaluation, (2) identify, within a field for each of the different instances, an attribute of the different instance that associates the different instance with a respective application, (3) determine that the respective applications to which the different instances of the file are associated are distinct applications and are known to be safe, (4) adjust a security policy for the file, by increasing an estimation that the file is malicious, based on the determination that the respective applications are distinct applications and are known to be safe, and (5) classify, in a software security system, the file as malicious based on the adjusted security policy that increased the estimation that the file is malicious. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of the interaction between a database of files and a database of applications.

Figure 1:
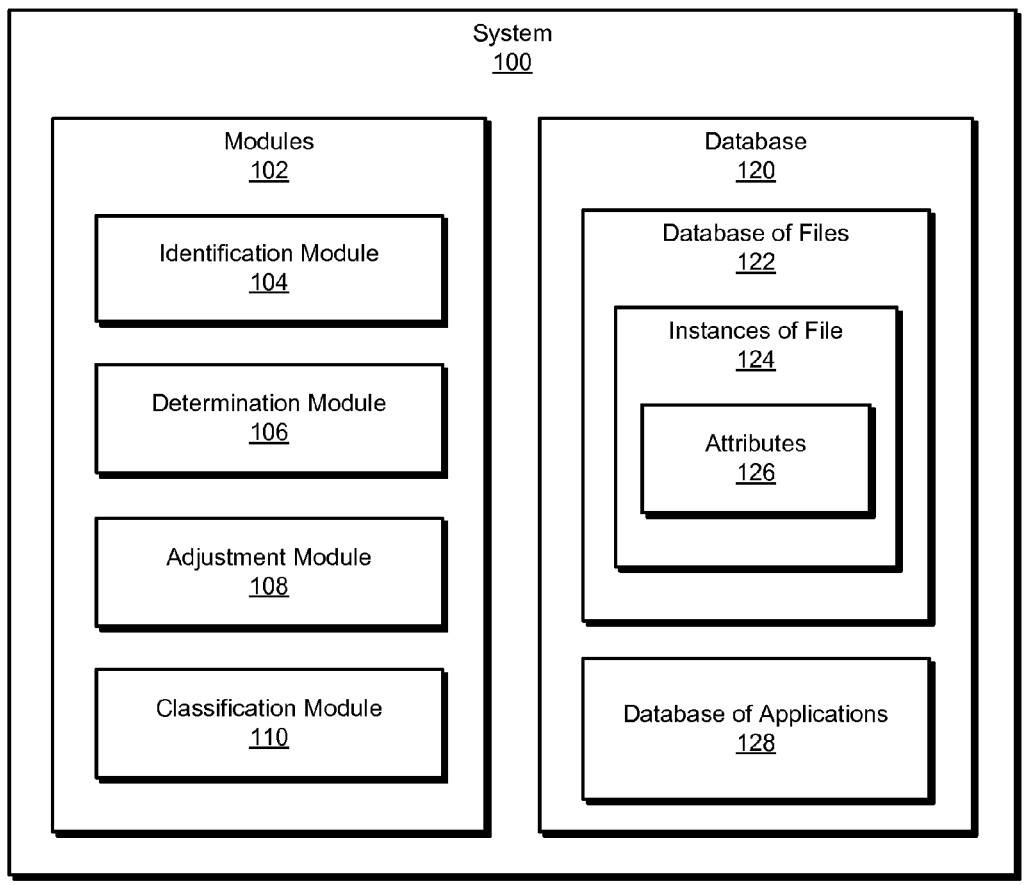
FIG. 1 is a block diagram of an exemplary system for identifying malicious files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying malicious files. As will be explained in greater detail below, the disclosed systems and methods may enable security companies to detect malicious files that have been disguised as safe by determining that the malicious files have been artificially associated with applications that are known to be safe in order to avoid detection. In some examples, the systems and methods may increase an estimation that a file is malicious in proportion to a number of distinct files that are determined to be associated with the file and determined to be known as safe.

Figure 2:
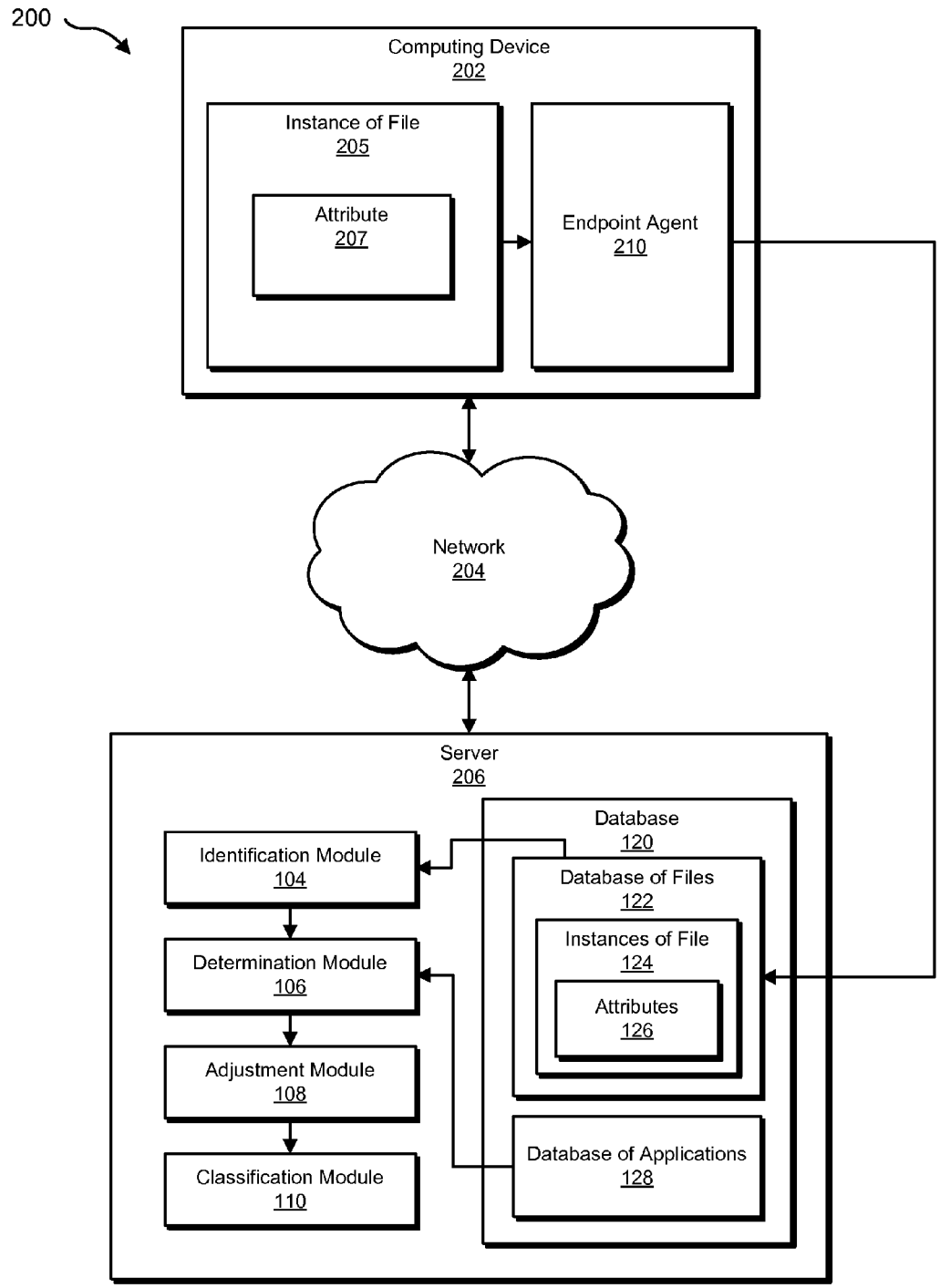
FIG. 2 is a block diagram of an additional exemplary system for identifying malicious files.

The following will provide, with reference to FIGS. 1-2, detailed descriptions of exemplary systems for identifying malicious files. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for identifying malicious files. As illustrated in this figure, exemplary system 100 may include one or more modules 102 for performing one or more tasks. For example, and as will be explained in greater detail below, exemplary system 100 may include an identification module 104 that may identify different instances of a file that is subject to a security evaluation and may identify, within a field for each of the different instances, an attribute of the different instance that associates the different instance with a respective application. Exemplary system 100 may additionally include a determination module 106 that may determine that the respective applications to which the different instances of the file are associated are distinct applications and are known to be safe. Exemplary system 100 may also include an adjustment module 108 that may adjust a security policy for the file, by increasing an estimation that the file is malicious, based on the determination that the respective applications are distinct applications and are known to be safe. Exemplary system 100 may additionally include a classification module 110 that may classify, in a software security system, the file as malicious based on the adjusted security policy that increased the estimation that the file is malicious.

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a database of files 122. Database of files 122 may store information relating to files that are subject to security evaluations. For example, database of files 122 may store data relating to instances of file 124 that are subject to security evaluations and may store information relating to attributes 126 of the instances. Database 120 may be further configured to store a database of applications 128. Database of applications 128 may in turn store information relating to applications that are known to be safe.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. In other embodiments, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to identify malicious files. For example, and as will be described in greater detail below, one or more of modules 102 may cause computing device 202 and/or server 206 to identify different instances of a file that is subject to a security evaluation, such as an instance of file 205 or instances of file 124.

In one example, an endpoint agent 210 may collect information relating to instances of a file that is subject to a security instance, such as instance of file 205, and transmit the information to database of files 122. One or more of modules 102 may also cause computing device 202 and/or server 206 to identify, within a field for each of the different instances, an attribute of the different instance that associates the different instance with a respective application, such as attributes 126. For example, endpoint agent 210 may collect information relating to an attribute 207 from within a field for instance of file 205. One or more of modules 102 may also cause computing device 202 and/or server 206 to determine that the respective applications to which the different instances of the file are associated, such as the applications described in database of applications 128, are distinct applications and are known to be safe. One or more of modules 102 may also cause computing device 202 and/or server 206 to adjust a security policy for the file, by increasing an estimation that the file is malicious, based on the determination that the respective applications are distinct applications and are known to be safe. One or more of modules 102 may also cause computing device 202 and/or server 206 to classify, in a software security system, such as system 200, the file as malicious based on the adjusted security policy that increased the estimation that the file is malicious.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and managing security classifications for files, as discussed below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
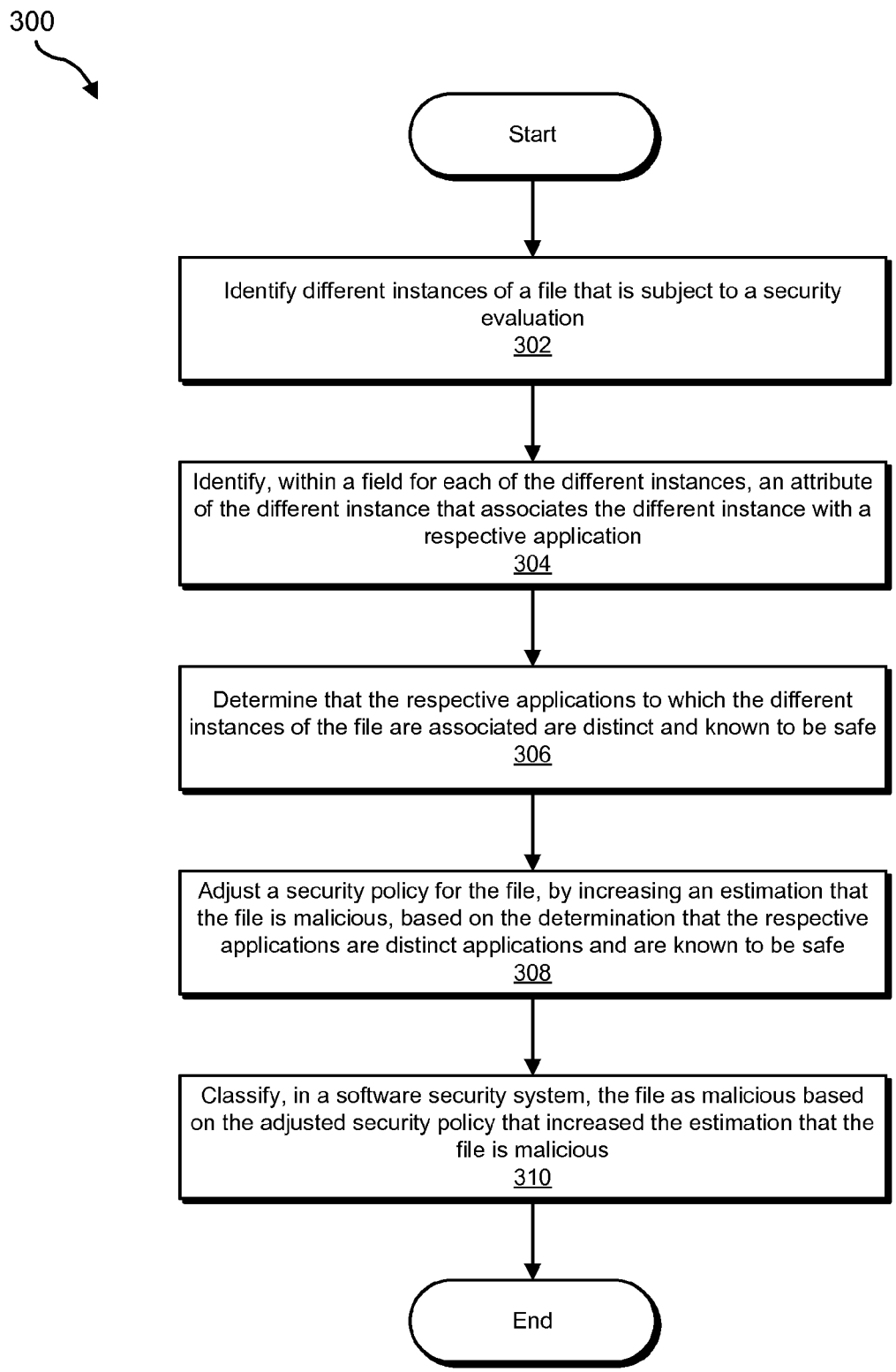
FIG. 3 is a flow diagram of an exemplary method for identifying malicious files.

FIG. 3 is a flow diagram of an exemplary computer-implemented method 300 for identifying malicious files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify different instances of a file that is subject to a security evaluation. For example, at step 302 identification module 104 may, as part of server 206 in FIG. 2, identify instances of file 124. As used herein, the term "instances of a file" generally refers to a set of files where each file in the set of files is an instance, a copy, and/or a sample, of the same file (or essentially the same file, despite minor differences in attributes like file name and header metadata, as discussed below). In some examples, each instance of the same file may be installed on a different user-endpoint. Information obtained from various instances may be aggregated and used to evaluate the security of the same file.

As used herein, the term "security evaluation" generally refers to any assessment of the security of a file. For example, a security evaluation may assess whether a file contains malware or is susceptible to malware. In some examples, a security evaluation may assess the security of a file by assessing information collected about the file from various instances of the file.

Identification module 104 may identify instances of file 124 in a variety of ways. In some examples, identification module 104 may identify instances of file 124 telemetrically. For example, endpoint agent 210 may identify an instance of a file, such as instance of file 205, that is located on the same computing device as endpoint agent 210, such as computing device 202. Endpoint agent 210 may then communicate that it has identified instance of file 205 to server 206. In some examples, the information communicated relating to the identified instances may be maintained in database of files 122. In some instances, endpoint agent 210 may communicate that it has identified instance of file 205 to server 206 in response to a query from server 206 for information relating to instances of a particular file that is subject to a security evaluation. In other instances, endpoint agent 210 may communicate that it has identified instance of file 205 to database of files 122 in response to a query from server 206 for files with particular features indicative of being subject to a security evaluation. In these embodiments, server 206 may determine, upon receiving responses to the query from the endpoint agents, that some of the files described in the responses, such as instances of file 124, are instances of the same file.

Additionally or alternatively, identification module 104 may identify instances of file 124 through a gateway security agent. For example, the gateway security agent may identify instance of file 205 and communicate that it has identified instance of file 205 to server 206. Once received, information relating to the identified instances may be stored in database of files 122.

In one embodiment, identification module 104 may identify different instances of a file by (1) executing a fingerprinting algorithm on a portion of each of the different instances of the file to generate a respective fingerprint and (2) determining that the respective fingerprints are the same. In some examples, identification module 104 may identify instances of file 124 as part of an effort to identify new or previously unclassified samples of files. In these embodiments, identification modules 104 may identify instances of file 124 using a data mining application.

Returning to FIG. 3, at step 304 one or more of the systems described herein may identify, within a field for each of the different instances, an attribute of the different instance that associates the different instance with a respective application. For example, at step 304 identification module 104 may, as part of server 206 in FIG. 2, identify, within a field for instance of file 205, attribute 207 of instance of file 205 that associates instance of file 205 with a respective application. Identification module 104 may similarly identify corresponding attributes for other instances of files identified within the same group of different instances of the same file, as described above for step 302.

As used herein, the term "attribute" may refer to any attribute, mark, metadata, characteristic, and/or feature that associates a file with an application. Examples of attributes may include a file name, a file location, a file path, file metadata, version information (e.g., the version information located in the header of a portable executable), and/or any other attribute that associates a file with an application.

As used herein, the term "field" refers to any attribute field, included in a file or corresponding to a file, that is capable of maintaining information that associates the file with an application. Examples of a field may include a file name field, a file location field, a file metadata field, a file path field, and/or a version information field. As used herein, the term "application" refers to any computer program and/or code that causes a computing system to perform useful tasks.

Figure 4:
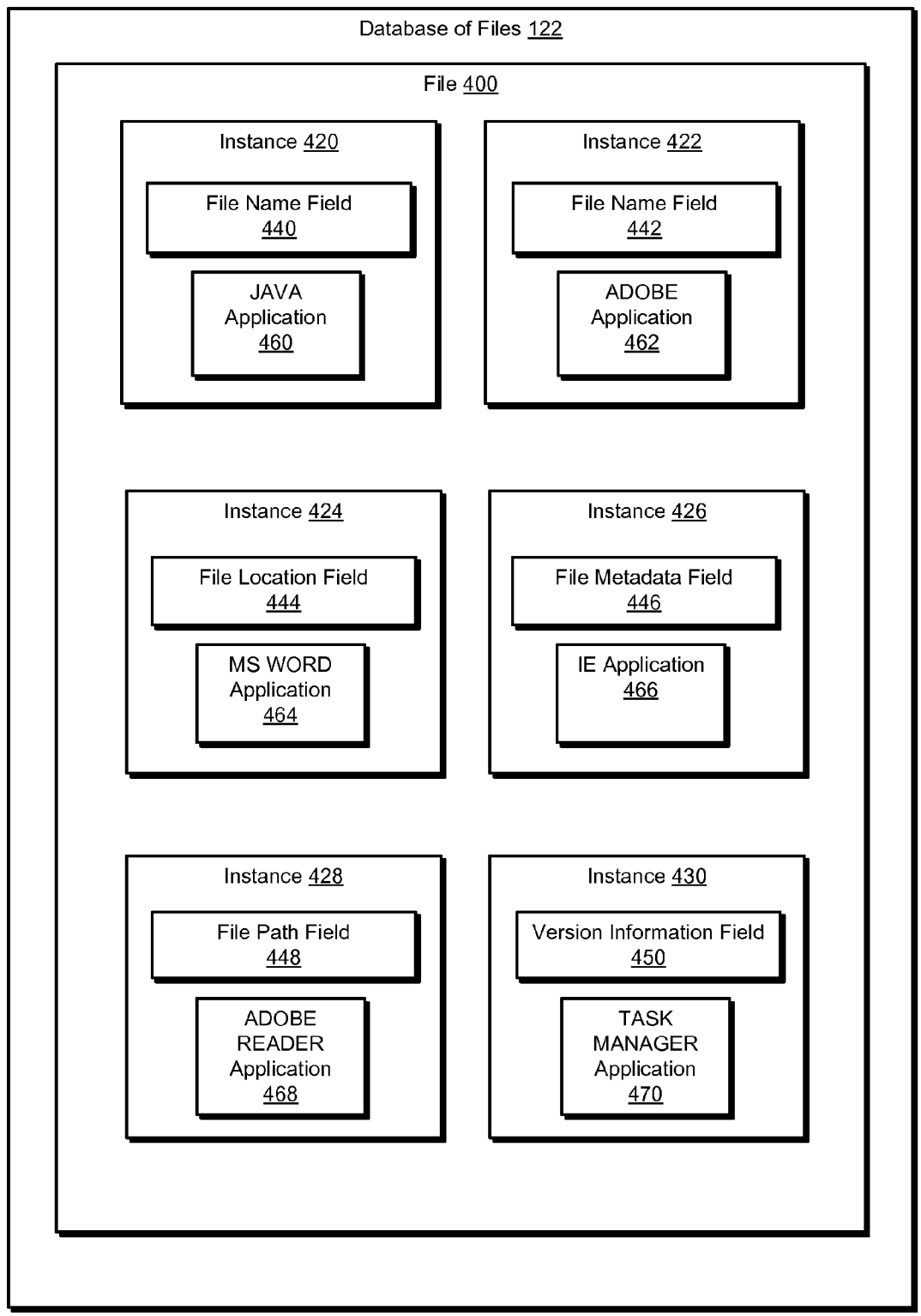
FIG. 4 is a block diagram of a database of instances of files with corresponding attributes that may be used to identify malicious files.

Identification module 104 may identify, within a field for each of the different instances, an attribute of the different instance that associates the different instance with a respective application in a variety of ways. In some examples, identification module 104 may use endpoint agent 210 to extract attribute 207 from instance of file 205. Endpoint agent 210 may then communicate information relating to attribute 207 to server 206. Once server 206 receives the information relating to attribute 207, and as illustrated in FIG. 4, server 206 may maintain a database of various instances of a file, such as database of files 122, that stores information that indicates which applications are associated with each of the instances. For example, database of files 122 may maintain data indicating that (1) a file 400 is associated with instances 420, 422, 424, 426, 428, and 430 and (2) that instance 420 is associated with a JAVA application 460, instance 422 is associated with an ADOBE application 462, instance 424 is associated with a MICROSOFT WORD application 464, instance 426 is associated with an INTERNET EXPLORER application 466, instance 428 is associated with an ADOBE READER application 468, and instance 430 is associated with a TASK MANAGER application 470. In some embodiments, identification module 104 may identify the same attribute for every instance of the file. For example, identification module 104 may identify the respective attribute for each instance of the file by identifying the file name of each instance of the file.

As illustrated in FIG. 4, the application with which each instance is associated may be identified by looking at attributes within one or more fields for each instance, such as a file name field 440, a file name field 442, a file location field 444, a file metadata field 446, a file path field 448, and/or a version information field 450. For example, the systems described herein may identify JAVA application 460 as associated with instance 420 by looking at file name field 440.

Returning to FIG. 3, at step 306 one or more of the systems described herein may determine that the respective applications to which the different instances of the file are associated are distinct applications and are known to be safe. For example, at step 306 determination module 106 may, as part of server 206 in FIG. 2, determine that the respective applications to which the different instances of the file within instances of file 124 are associated are distinct applications and are known to be safe. An application may be "known to be safe" if the application has a security classification that indicates that the application is free of malware and/or is not susceptible to malware. In some embodiments, an application may be "known to be safe" if the application is associated with a trusted entity, for example by having a digital signature from a trusted entity. Additionally or alternatively, an application may be "known to be safe" if the application has been determined to be safe following a security scan. In some examples, an application may be "known to be safe" if the application has been previously determined to be safe and subsequently whitelisted.

Determination module 106 may determine that the respective applications to which the different instances of the file are associated are distinct applications and are known to be safe in a variety of ways. For example, and as illustrated in FIG. 4, determination module 106 may determine that instances 420, 422, 424, 426, 428, and 430 are associated with JAVA application 460, ADOBE application 462, MICROSOFT WORD application 464, INTERNET EXPLORER application 466, ADOBE READER application 468, and TASK MANAGER application 470, respectively, and that each of these applications is known to be safe.

In some embodiments, determination module 106 may determine that at least a threshold number of the respective applications are distinct applications and are known to be safe. In response, classification module 110 may classify the file as malicious just based on the threshold being satisfied, as a sufficient condition for being malicious (even if other sufficient conditions are present). In these embodiments, determination module 106 may have a threshold number of five, for example. Determination module 106 may determine that respective applications 460, 462, 464, 466, 468, and 470 to which the different instances 420, 422, 424, 426, 428, and 430 are associated are distinct and are known to be safe because six of the applications are distinct and are known to be safe, and six is greater than the threshold number five. In some examples, the threshold number may be an absolute number, such as five. In further examples, identification module 104 may have identified instances of files associated with malicious or unknown applications, in addition to identifying instances of files associated with safe applications, as discussed above. Thus, the threshold number may specify a proportion of safe applications from among a total number of distinct applications identified by attributes for the various instances of the file. Similarly, the threshold number may specify a proportion of instances associated with a safe application from among a total number of instances identified within a group of instances of the same file (e.g., identified over the same period of time, geography, and/or other limiting feature). These last two calculations may differ because two instances of the file may have attributes associating the file with the same application, which may be known to be safe or malicious (or unknown). The systems and methods herein may also perform method 300 using any combination (e.g., weighted sum or product) of the above techniques.

Returning to FIG. 3, at step 308 one or more of the systems described herein may adjust a security policy for the file by increasing an estimation that the file is malicious, based on the determination that the respective applications are distinct applications and are known to be safe. For example, at step 308 adjustment module 108 may, as part of server 206 in FIG. 2, adjust a security policy for a file by increasing an estimation that the file is malicious. This adjustment may be made based on the determination that the applications associated with different instances of the file, such as instance of file 205, are distinct applications and are known to be safe.

As used herein, the term "security policy" generally refers to any rule directed to protecting against malware. For example, a "security policy" may refer to a policy for classifying files as malicious. As used herein, the term "an estimation that a file is malicious" may refer generally to an estimated likelihood (e.g., binary or granular) that a file is malicious. This estimation may be estimated in a variety of ways. In some examples, the estimation may be based on a single factor (e.g., the technique of method 300) or a combination of multiple factors, such as the reputation of the entity that digitally signed the file, the results of a security scan applied to the file, user reports generated about the file, etc. In some embodiments, adjustment module 108 may adjust the security policy by simply converting a security classification to malicious, as described below for step 310, effectively performing steps 308 and 310 in the same action, in parallel, or immediately in sequence. In other embodiments, adjustment module 108 may adjust the security policy without immediately classifying the file as malicious, such as by considering additional (e.g., countervailing) factors that balance out, or override, the initial estimation of maliciousness.

Adjustment module 108 may adjust a security policy for a file, by increasing an estimation that the file is malicious, based on the determination that the respective applications are distinct applications, and are known to be safe, in a variety of ways. For example, and as illustrated in FIG. 5, adjustment module 108 may increase an estimation that a file 522 (among other files, such as a file 520 and a file 524) is malicious based on a determination that file 522 is associated with applications 462, 466, and 470, each of which is distinct from the other applications in this group of three applications, and each of which is known to be safe. In one example, adjustment module 108 may increase an estimation that file 522 is malicious by decreasing a security score associated with file 522 from 35% to a percentage lower than 35%. The amount by which the estimation is increased may be an absolute amount or the amount can vary based on the number of respective applications that are distinct and known to be safe (e.g., based on the calculated proportions of instances/applications discussed above). Adjustment module 108 may also adjust the security policy in (linear or nonlinear) proportion to the number of distinct, safe applications, the reputation of one or more (or all) of the identified applications, the prevalence of one or more (or all) of the identified applications, and/or the relatedness or dissimilarity between two or more of the identified applications. In other words, well known applications with good reputations, like MICROSOFT WORD, may increase the estimation of maliciousness for file 522 more than other distinct applications, with lesser reputations or lesser known reputations, because MICROSOFT WORD serves as a better disguise. Similarly, dissimilar applications (e.g., a photo editing program and a mathematics program) may increase an estimation of maliciousness more than more similar applications (e.g., a photo editing program and a photo publishing program). Moreover, database 120 may store estimations of reputation, prevalence, fields/subjects, and/or relatedness (e.g., based on fields/subjects for different applications).

Returning to FIG. 3, at step 310 one or more of the systems described herein may classify, in a software security system, the file as malicious based on the adjusted security policy that increased the estimation that the file is malicious. For example, at step 310 classification module 110 may, as part of server 206 in FIG. 2, classify, in a software security system, a file as malicious based on the adjusted security policy that increased the estimation that the file is malicious.

Classification module 110 may classify, in a software security system, the file as malicious based on the adjusted security policy that increased the estimation that a file is malicious in a variety of ways. In some embodiments, the classification may be a security score. In such embodiments, classification module 110 may lower a security score of a file or may assign a security score that indicates that a file is insecure to a file that was previously unclassified. Additionally or alternatively, the classification may be a categorization, such as "secure," "insecure," or "indeterminate." In such embodiments, classification module 110 may classify a file as insecure that was previously classified as secure or may classify as insecure a file that was previously unclassified. Moreover, classification module 110 may classify the file by determining that its security score, such as those shown in FIG. 5, satisfies a maliciousness threshold.

In some examples, classification module 110 may add the file to a database of insecure files after classifying the file as malicious. Additionally or alternatively, classification module 110 may classify an additional file as malicious based on a determination that the additional file has a feature in common with the file that was classified as malicious based on the adjusted security policy. In some examples, the feature in common may be a static feature, such as having the same attribute, e.g., the same file name. Additionally or alternatively, the feature in common may be exhibiting the same functionality.

As described above, the disclosed systems and methods may enable security companies to detect malicious files that programmers have been disguising as safe by determining that the programmers have artificially associated the malicious files with applications that are known to be safe in order to avoid detection. In some examples, the systems and methods may increase an estimation that a file is malicious in proportion to a number of distinct files that are determined to be associated with the file and determined to be known as safe.

Figure 6:
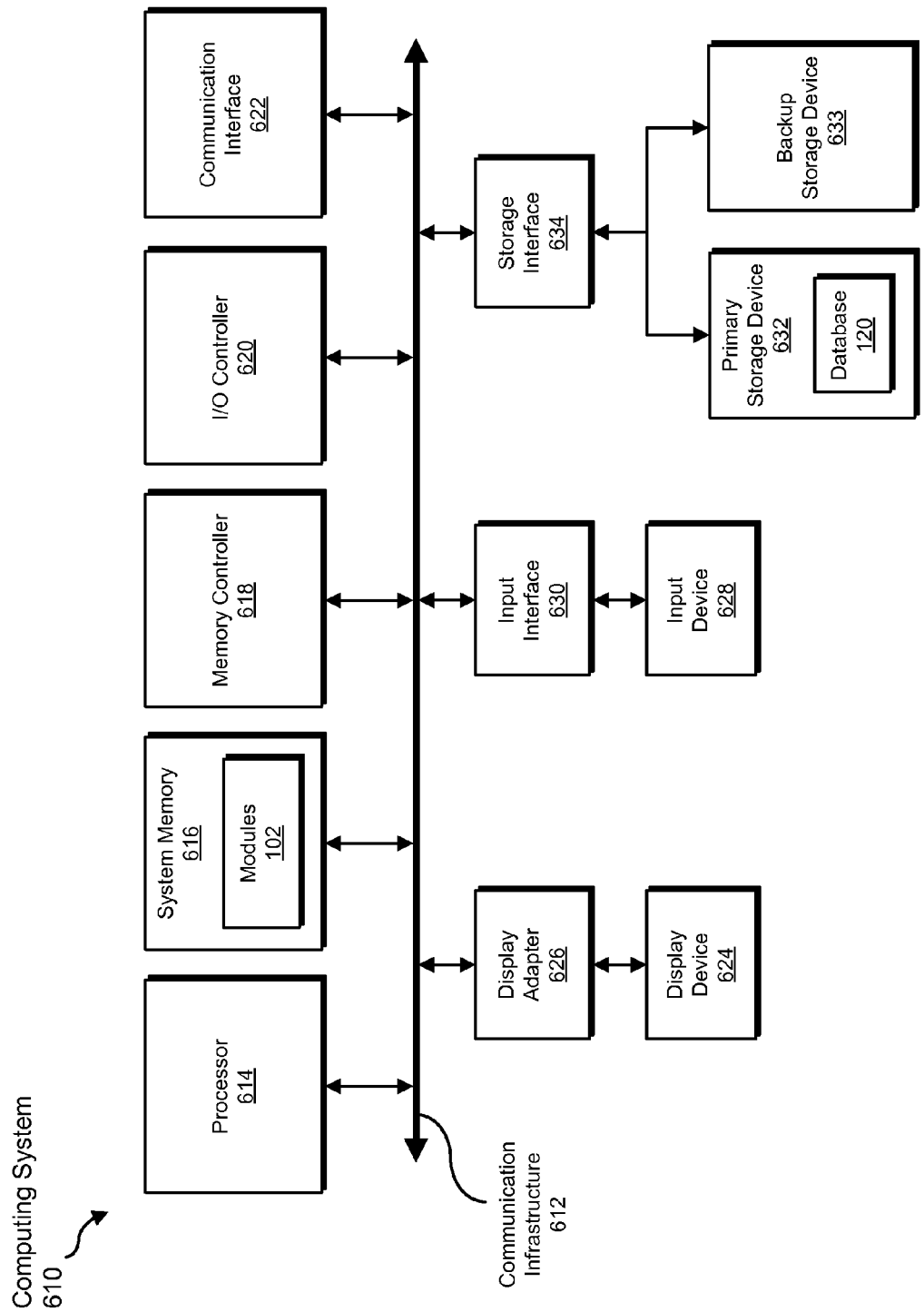
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions.

Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
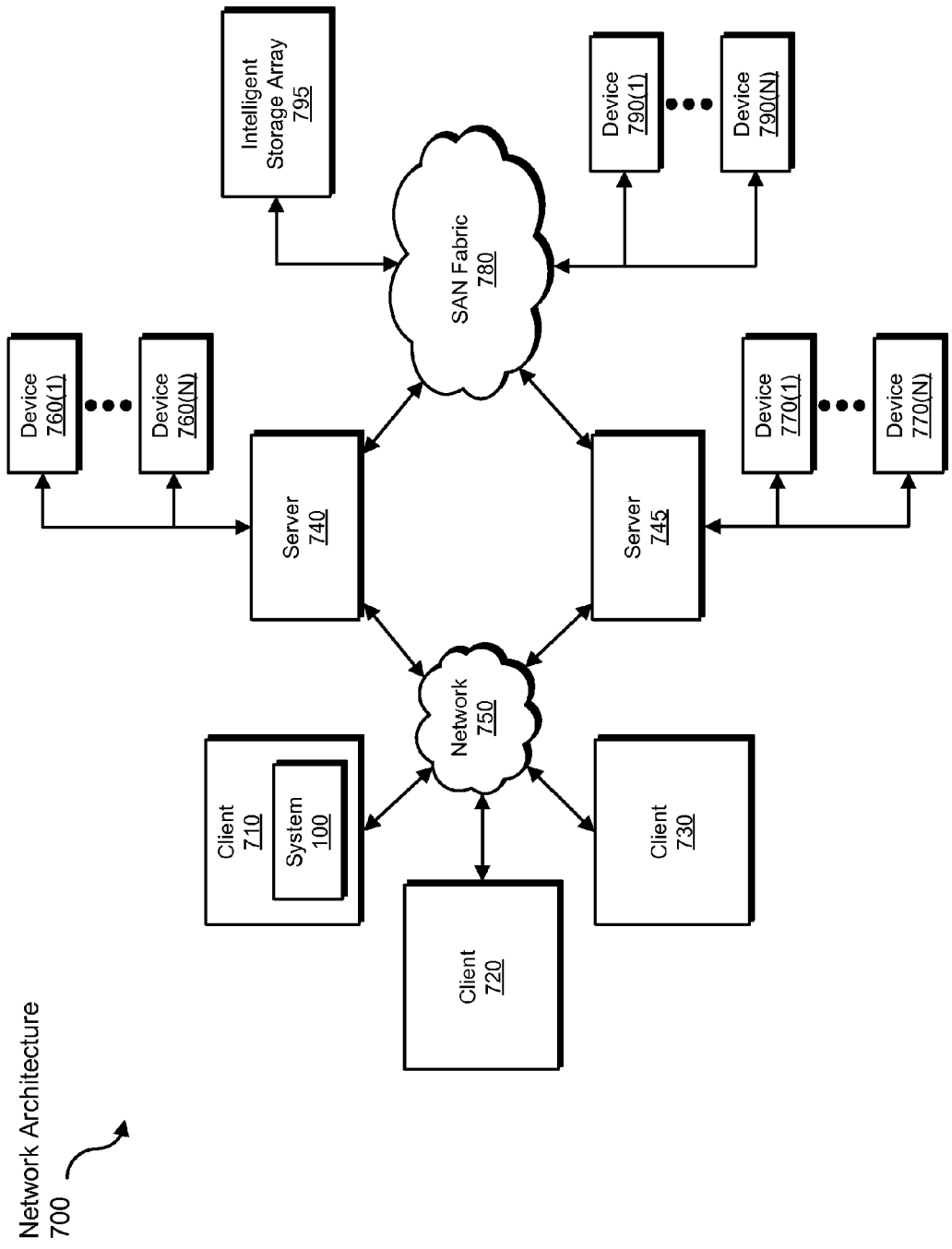
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying malicious files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a security score from a higher score to a lower score and/or transform a classification of a file from secure to insecure. These modules may similarly (1) receive a file security classification, (2) transform the file security classification, (3) output a result of the transformation to a database and/or software security system, (4) use the result of the transformation to protect users from malicious files and/or (5) store the result of the transformation to a memory or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying malicious files, at least a portion of the method being performed by a computing device comprising at least one processor, the method comprising:
    identifying different instances of a file that is subject to a security evaluation;
    identifying, within a field for each of the different instances, an attribute of the different instance that associates the different instance with a respective application;
    determining that the respective applications to which the different instances of the file are associated are distinct applications and are known to be safe by determining that at least a threshold number of the respective applications are distinct applications and are known to be safe;
    adjusting a security policy for the file, by increasing an estimation that the file is malicious, based on the determination that the respective applications are distinct applications and are known to be safe;
    classifying, in a software security system, the file as malicious based on the adjusted security policy that increased the estimation that the file is malicious.

2. The computer-implemented method of claim 1, wherein the attribute that associates the different instance with a respective application comprises at least one of:
    a file name;
    a file location;
    a file path;
    file metadata;
    version information.

3. The computer-implemented method of claim 2, wherein:
    the attribute comprises the version information;
    the version information is located in the header of a portable executable.

4. The computer-implemented method of claim 1, wherein:
    identifying the different instances of the file comprises identifying a first instance of the file and a second instance of the file;
    identifying, within the field for each of the different instances, the attribute of the different instance comprises:
        identifying, within a field for the first instance, an attribute of the first instance that associates the first instance with a first application;
        identifying, within a field for the second instance, an attribute of the second instance that associates the second instance with a second application;
    determining that the respective applications to which the different instances of the file are associated are distinct applications and are known to be safe comprises:
        determining that the first application is known to be safe;
        determining that the second application is known to be safe.

5. The computer-implemented method of claim 1, wherein the attribute of the instance is the same type of attribute for each identified instance of the file.

6. The computer-implemented method of claim 1, wherein the different instances of the file are identified by:
    executing a fingerprinting algorithm on a portion of each of the different instances of the file to generate a respective fingerprint;
    determining that the respective fingerprints are the same.

7. The computer-implemented method of claim 1, wherein a data mining application performs the method to classify previously unclassified files.

8. The computer-implemented method of claim 1, wherein identifying the attribute of the instance comprises:
    deploying an endpoint agent onto a user endpoint;
    using the endpoint agent to collect information relating to the attribute of the instance, wherein:
        the instance of the file is located on the user endpoint;
        the information identifies the respective application to which the attribute is associated.

9. The computer-implemented method of claim 1, wherein:
    identifying the attribute of the instance comprises using a gateway security agent to collect information relating to the attribute of the instance;
    the information identifies the respective application to which the attribute is associated.

10. The computer-implemented method of claim 1, further comprising:
    detecting an additional file that shares a common feature with the file;
    classifying the additional file as malicious based on detecting that the additional file has the feature in common with the file.

11. The computer-implemented method of claim 10, wherein the common feature comprises at least one of:
    a static feature in common with the file;
    a same functionality as the file.

12. A system for identifying malicious files, the system comprising:
    an identification module, stored in memory, that identifies different instances of a file that is subject to a security evaluation and that identifies, within a field for each of the different instances, an attribute of the different instance that associates the different instance with a respective application;
    a determination module, stored in memory, that determines that the respective applications to which the different instances of the file are associated are distinct applications and are known to be safe by determining that at least a threshold number of the respective applications are distinct applications and are known to be safe;
    an adjustment module, stored in memory, that adjusts a security policy for the file, by increasing an estimation that the file is malicious, based on the determination that the respective applications are distinct applications and are known to be safe;
    a classification module, stored in memory, that classifies, in the system, the file as malicious based on the adjusted security policy that increased the estimation that the file is malicious;
    at least one physical processor configured to execute the identification module, the determination module, the adjustment module, and the classification module.

13. The system of claim 12, wherein the attribute that associates the different instance with a respective application comprises at least one of:
- a file name;
- a file location;
- a file path;
- file metadata;
- version information.

14. The system of claim 13, wherein:
the attribute comprises the version information;
the version information is located in the header of a portable executable.

15. The system of claim 12, wherein the identification module identifies the different instances of the file by identifying different instances of the file that are each installed on a different user-endpoint.

16. The system of claim 12, wherein the attribute of the instance is the same type of attribute for each identified instance of the file.

17. The system of claim 12, wherein the identification module identifies the different instances of the file by:
executing a fingerprinting algorithm on a portion of each of the different instances of the file to generate a respective fingerprint;
determining that the respective fingerprints are the same.

18. The system of claim 12, wherein the identification module, the determination module, the adjustment module, and the classification module function as part of a data mining application to classify previously unclassified files.

19. The system of claim 12, wherein the system is configured to further:
deploy an endpoint agent onto a user endpoint;
use the endpoint agent to collect information relating to the attribute of the instance, wherein:
the instance of the file is located on the user endpoint;
the information identifies the respective application to which the attribute is associated.

20. A non-transitory computer-readable medium comprising one or more computer-readable instructions that, when executed by at least one processor of a computing device, cause the computing device to:
identify different instances of a file that is subject to a security evaluation;
identify, within a field for each of the different instances, an attribute of the different instance that associates the different instance with a respective application;
determine that the respective applications to which the different instances of the file are associated are distinct applications and are known to be safe by determining that at least a threshold number of the respective applications are distinct applications and are known to be safe;
adjust a security policy for the file, by increasing an estimation that the file is malicious, based on the determination that the respective applications are distinct applications and are known to be safe;
classify, in a software security system, the file as malicious based on the adjusted security policy that increased the estimation that the file is malicious.

* * * * *